United States Patent [19]

Bristol

[11] Patent Number: 4,465,042

[45] Date of Patent: Aug. 14, 1984

[54] CRANKLESS INTERNAL COMBUSTION ENGINE

[76] Inventor: Robert D. Bristol, P.O. Box 337, Beulah, Mich. 49617

[21] Appl. No.: 413,610

[22] Filed: Sep. 1, 1982

Related U.S. Application Data

[63] Continuation-in-part of Ser. No. 157,870, Jun. 9, 1980, Pat. No. 4,363,299.

[51] Int. Cl.[3] .............................................. F16H 21/02

[52] U.S. Cl. ......................... 123/197 R; 123/197 AB; 123/197 AC; 123/58 A; 123/56 C; 123/54 A; 74/53

[58] Field of Search ..... 123/197 R, 197 AB, 197 AC, 123/58 R, 58 A, 56 C, 54 R, 54 B, 54 A; 74/53, 54

[56] References Cited

U.S. PATENT DOCUMENTS

| | | | |
|---|---|---|---|
| 670,997 | 4/1901 | McLean | 123/197 R |
| 855,256 | 5/1907 | Morey | 123/197 R |
| 1,089,408 | 3/1914 | Ganderton | 74/58 |
| 1,197,591 | 9/1916 | Bargery | 123/197 R |
| 1,338,311 | 4/1920 | Leonard et al. | 123/197 R |
| 1,481,727 | 1/1924 | Moore | 123/197 R |
| 1,505,856 | 8/1924 | Briggs | 123/197 AC |
| 1,537,724 | 5/1925 | Zimmer | 123/197 R |
| 1,561,826 | 11/1925 | Bremer | 74/58 |
| 1,667,213 | 3/1928 | Marchetti | 123/197 R |
| 1,687,744 | 10/1928 | Webb | 123/197 R |
| 1,873,908 | 8/1932 | Schinke | 123/197 AC |
| 1,885,298 | 11/1932 | Schell | 74/30 |
| 2,032,495 | 3/1936 | Nuesell | 74/57 |
| 2,294,812 | 9/1942 | Szopieray | 123/197 R |
| 2,392,921 | 1/1946 | Holman | 123/197 AC |
| 2,407,859 | 9/1946 | Wilson | 74/55 |
| 2,477,376 | 7/1949 | Jacobsen | 123/197 AC |
| 2,757,547 | 8/1956 | Julin | 123/54 A |
| 3,384,057 | 5/1968 | Boone | 123/197 R |
| 3,916,866 | 1/1975 | Rossi | 123/197 R |

*Primary Examiner*—Craig R. Feinberg
*Assistant Examiner*—David A. Okonsky
*Attorney, Agent, or Firm*—Price, Heneveld, Huizenga & Cooper

[57] ABSTRACT

A power transmission mechanism primarily adapted for converting reciprocating motion of a piston within a cylinder to rotary motion includes a cam member defining a closed loop cam track having first and second spaced, essentially vertical runs. A shaft is rotatably supported adjacent one of the cam track runs. A drive member is secured to the shaft and the drive member has a peripheral portion extending along the cam track. A force transmitting member moves along the cam track and engages the drive member. In the preferred form, the force transmitting member includes a plurality of abutting discs. A lower end of a connecting rod is pinned to one of the discs.

29 Claims, 9 Drawing Figures

CRANKLESS INTERNAL COMBUSTION ENGINE

CROSS REFERENCE TO RELATED APPLICATION

This application is a continuation-in-part of application Ser. No. 157,870, filed June 9, 1980 and now U.S. Pat. No. 4,363,299, issued Dec. 14, 1982.

BACKGROUND OF THE INVENTION

This invention relates to internal combustion engines and more particularly to a mechanism for converting reciprocating movement of a piston to rotating output movement.

Conventional internal combustion engines include at least one cylinder within which a piston reciprocates. The piston is connected to an output crank by an elongated connecting rod pivoted at an upper end to the piston and at a lower end to the crank. An air/fuel mixture is taken into the cylinder, compressed by the piston and ignited by a spark ignition system. As the ignited air/fuel mixture expands, the piston is forced downwardly during the power stroke of the engine. The piston, through the connecting rod, imparts torque to the crank of the crankshaft, causing the crankshaft to rotate.

During the power stroke of a typical engine, the peak pressures within the cylinder are not experienced when the effective moment arm between the piston and the crank is at a maximum. This reduces the efficiency and power output of the engine and is the result of the kinematics inherent in the piston, rod and crank structure. Various proposals have been made to delay the attainment of peak pressures until the piston moves beyond top dead center and the mechanical advantage or torque output is maximized. Such proposals have included apparatus to provide a delayed pressure increase to compensate for combustion chamber volume increase during the power stroke. These approaches are discussed in my earlier application Ser. No. 950,368, filed Oct. 11, 1978, and now U.S. Pat. No. 4,211,082.

During the operation of conventional internal combustion engines, significant losses or reduction in mechanical advantages occur due to the angular relationships of the piston, connecting rod and conventional crank arm. At top dead center, no torque can be transmitted through the crank. Increased torque and hence a decrease in loss occur as the engine goes through the power stroke. The useful work obtained is a function of an ever-changing amount of pressure within the engine combustion chamber multiplied by the infinitely small distance the piston, rod and crank have moved at each pressure. This is according to the principle of resultant forces which is at work in the process. At the same time, the compound angular application of the pressure causes additional friction on the cylinder walls resulting in additional losses in efficiency. Because these losses are substantial, a need exists for a mechanism which will lessen the angle at which the pressure is applied and increase the distance which the lower end of the connecting rod moves under more favorable torque conditions.

Various attempts have been made to eliminate the conventional connecting rod and crank mechanism to increase the mechanical efficiency or torque output and to reduce other losses caused by the nonlinear movement of the connecting rod during the power stroke. An example of one such proposal may be found in U.S. Pat. No. 1,505,856, entitled EXPLOSIVE MOTOR and issued on Aug. 19, 1924 to Briggs. This patent discloses an internal combustion engine including a piston reciprocating within a cylinder. A crank is offset from the vertical centerline of the piston and is connected to the piston by a vertically moving rod and cam block. The block defines an elongated cam slot within which a crank pin is slidably disposed. The rod is guided for linear, vertical up and down movement. The piston, during the power stroke, applies force to the crank along a line which approaches a perpendicular. Also, offsetting of the cylinder with respect to the crank reduces the side thrust or loading and hence frictional losses.

Other engines wherein a connecting rod moves along in an essentially vertical line and wherein a conventional crank is eliminated may be found in U.S. Pat. No. 1,667,213, entitled INTERNAL COMBUSTION ENGINE and issued on Apr. 24, 1924, to Marchetti; U.S. Pat. No. 2,407,859, entitled MECHANICAL MOVEMENT and issued on Sept. 17, 1946, to Wilson; U.S. Pat. No. 2,757,547, entitled UNIVERSAL DOUBLE TORQUE ENGINE and issued on Aug. 7, 1956, to Julin; and U.S. Pat. No. 3,916,866, entitled ENGINE HAVING RECIPROCATING PISTON AND ROTARY PISTON and issued on Nov. 4, 1975, to Rossi.

SUMMARY OF THE INVENTION

In accordance with the present invention, a unique power transmission means adapted for use in an internal combustion engine is provided which includes means for increasing the torque output and reducing friction losses. Essentially, the power transmission includes a vertically extending, closed loop path or cam track defined by a cam member. A shaft is supported adjacent a run of the cam track. A force transmission means moves along the cam track. The force transmission means is operatively connected to the shaft.

In narrower aspects of the invention, a plurality of discs are disposed in the cam track in abutting relationship. A connecting rod lower end of the engine is disposed within the track and moves the discs as the rod is reciprocated by a piston to which it is connected. The vertical centerline of the cam track is preferably offset from the vertical centerline of the piston of the engine.

DETAILED DESCRIPTION OF THE PREFERRED EMBODIMENT

Figure 1:
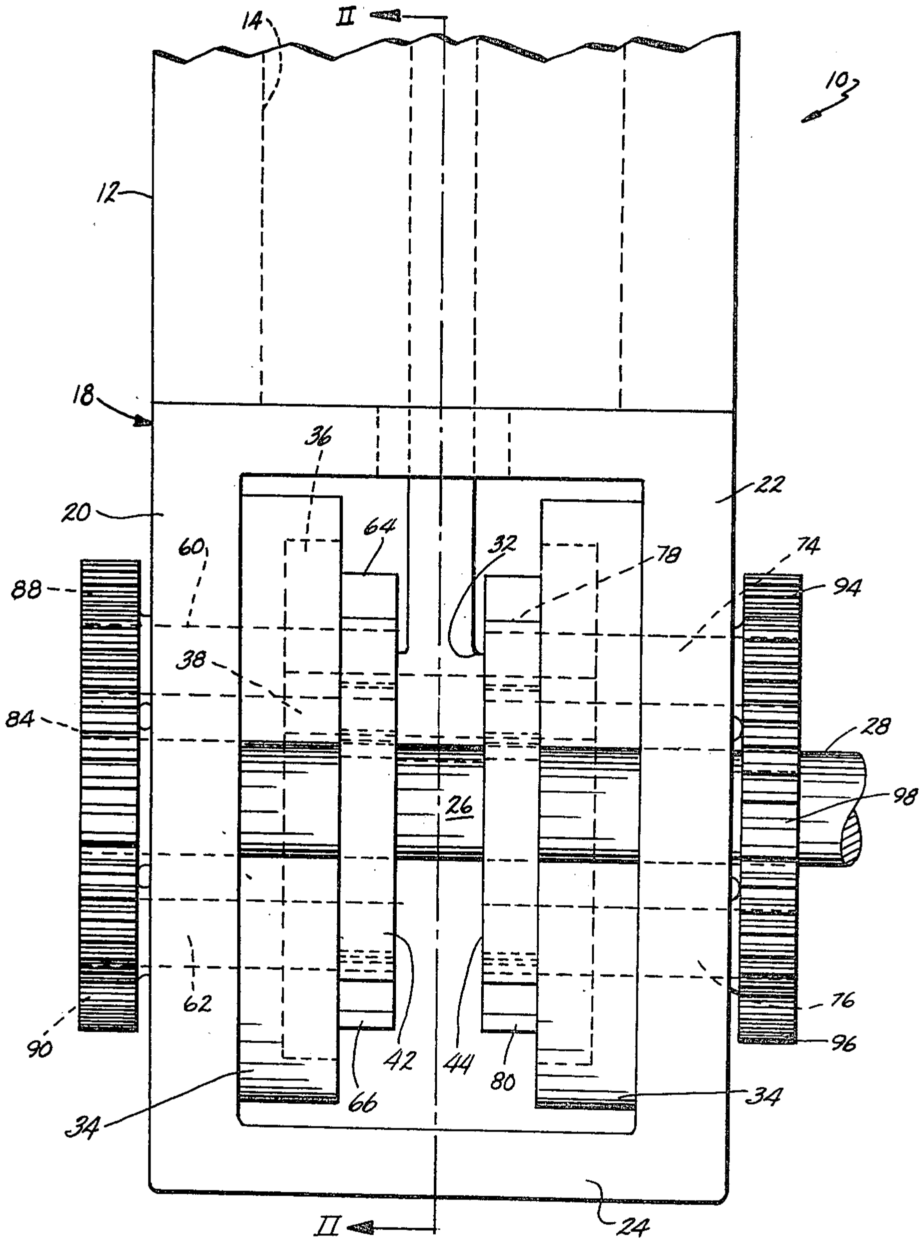
FIG. 1 is a fragmentary, side elevational view of an internal combustion engine in accordance with the present invention.

A preferred embodiment of a unique internal combustion engine in accordance with the present invention is illustrated in FIG. 1 and generally designated 10. For the sake of simplicity, only a single cylinder engine has been illustrated. Also, conventional details of an internal combustion engine including the lubricating system, the valve train and ignition system have not been illustrated. These may be of a conventional design and are well known to those of ordinary skill in the art. Also, it should be understood that terms such as horizontal and vertical are used herein for convenient reference purposes only. The terms are used to signify essentially perpendicular relationships.

Figure 2:
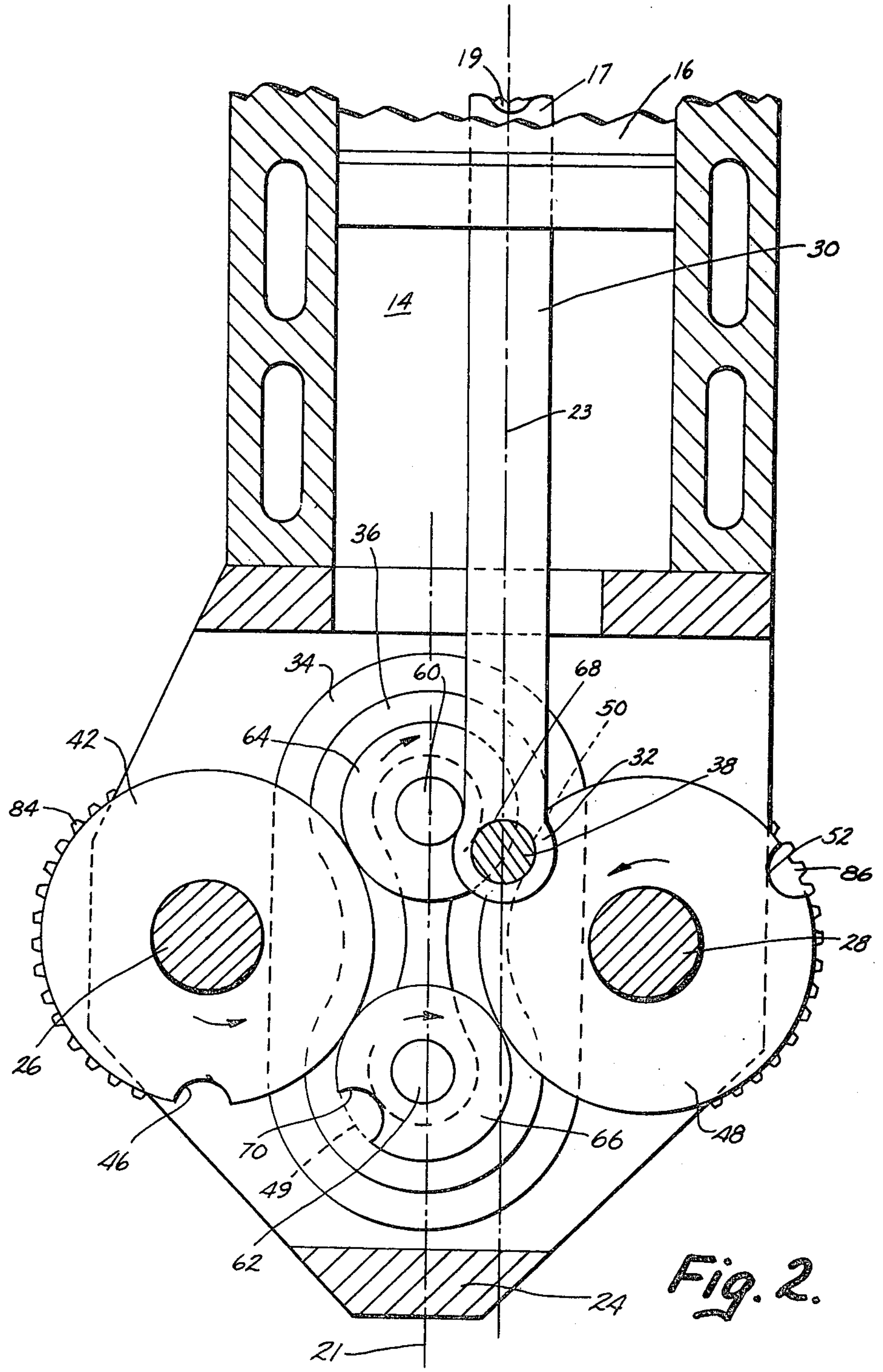
FIG. 2 is a fragmentary, cross-sectional view taken generally along line II—II of FIG. 1.

Engine 10 includes a cylinder block 12 defining a cylinder 14 within which a piston 16 reciprocates (FIG. 2). Cylinder 14 is supported on a case or shaft supporting structure 18. Case 18 includes end support members 20, 22 and a bottom cross member 24.

As best seen in FIG. 2, end members 20, 22 rotatably support a pair of opposed, horizontally positioned and spaced shafts 26, 28. In the embodiment illustrated, shaft 28 is an output shaft driven by a reciprocating piston, as described below.

An elongated rod 30 is pivotally connected at an upper end 17 to piston 16 by a pin 19. The rod extends from the piston downwardly into the case 18. Guide means are provided for guiding a lower end 32 of the rod along a closed, curvilinear, vertically extending path during reciprocating motion of piston 16. As seen in FIGS. 1 and 2, each end member 20, 22 defines or has affixed thereto a guide or cam plate 34. Each plate 34 defines a vertically extending, closed loop cam slot or track 36 having horizontally spaced, essentially vertical runs. Lower end 32 of rod 30 has a pin 38 extending therethrough. Pin 38 is slidably disposed within tracks 36 of cam plates 34. As best seen in FIG. 2, the vertical or longitudinal centerline 21 (FIG. 2) of each plate 34 is offset to one side from the vertical centerline 23 of cylinder 14 and piston 16. Nonrotatably secured to shaft 26 in longitudinally spaced, opposed relationship are a pair of discs or sprockets 42, 44. Sprockets 42, 44 are mirror images of each other and each defines a recess 46 (FIG. 2) opening through its outer periphery. Similarly, output shaft 28 has nonrotatably keyed or secured thereto a pair of mirror image power discs or sprockets 48, only one of which is seen in the drawings. Each sprocket 48 defines a pair of circumferentially spaced recesses 50, 52 opening through its outer periphery. Discs 42, 44 and 48, as seen in FIG. 2, are dimensioned so that their outer peripheries extend along a centerline 49 of cam track 36. As described in further detail below, as piston 16 moves downwardly during the power stroke, pin 38 of rod 30 will move downwardly within track 36 and engage one of recesses 50, 52 of output discs or sprockets 48. As shown in FIG. 2, rod 30 will move downwardly along essentially a vertical line with output shaft 28 offset from the vertical centerline of the cylinder. The torque transmitted to output shaft 28 is increased over that obtained by a conventional crank assembly. Also, the esentially vertical movement of rod 30 during the power stroke reduces or eliminates side thrusts or side loading between the piston and the cylinder wall. This reduces frictional losses during operation of the engine, thereby increasing overall efficiency.

As best seen in FIG. 2, a pair of vertically spaced stub shafts 60, 62 extend through end member 20. Shafts 60, 62 support guide discs or sprockets 64, 66, respectively. Disc 64 defines a semicircular recess 68 opening through its periphery. Similarly, disc 66 defines a semicircular recess 70 opening through its periphery. Shafts 60, 62 are positioned and discs 64, 66 are dimensioned so that the outer diameters of the discs lie along the centerline of cam track 36.

End member 22 similarly supports a pair of vertically spaced stub shafts 74, 76. Shafts 74, 76 are coaxial with shafts 60, 62 and have nonrotatably secured thereto guide discs or sprockets 78, 80 which are mirror images of sprockets 64, 66. The discs on the stub shafts and cams 34 move, guide or direct the rod pin 38 along the guide track 36 during movement of piston 16.

As seen in FIGS. 1 and 2, shafts 26, 28 have synchronizing gears 84, 86 nonrotatably secured thereto exteriorly of case 18. Gears 84, 86 mesh with synchronizing gears 88, 90 nonrotatably secured to shafts 60, 62, respectively. Shafts 74, 76 similarly include synchronizing gears 94, 96 which mesh with gears 98 affixed to shafts 26, 28 exteriorly of end member 22 of case 18. Only one of the gears 98 is illustrated in FIG. 1. The synchronizing gears insure that the discs on shafts 26, 28, 60, 62 and 74, 76 move in a synchronized or timed relationship so that the recesses on the respective discs or sprockets cooperate to receive pin 38 of lower end of connecting rod 30. Sprockets 42, 44, 48, 64, 66, 78 and 80 move the lower end 32 of the connecting rod along the path defined by cam track 36.

OPERATION

With reference to FIG. 2, the operation of the internal combustion engine in accordance with the present invention should be apparent. As illustrated therein, piston 16 is beginning its power stroke and is moving from a top dead center position downwardly towards its bottom dead center of lowermost position within cylinder 14. Sprockets 48, 64 are positioned so that pin 38 is disposed within recesses 68, 50 of the respective sprockets. As piston 16 moves downwardly, pin 38 is guided within cam track 36 and torque is transmitted through disc 48 to output shaft 28. Due to the intermeshing of the synchronizing gears, lower guide sprocket 66 is rotating in a clockwise direction when viewed in FIG. 2. As piston 16 approaches the end of its power stroke, recess 70 will be presented to receive pin 38 and disc 66 will move the pin along the lower end of cam track 36 until it is moved into engagement with recess 46 of disc 42. Disc 42, in cooperation with cam track 36, will then guide and move pin 38 upwardly until the pin is received within recess 68 of disc 64.

During upward movement of piston 16, exhaust gases are removed from the cylinder. Piston 16 moves downwardly in the intake stroke. Piston 16 then moves upwardly to compress the air/fuel mixture which is then ignited and the power stroke is repeated.

Connecting rod 30 moves downwardly during the power stroke along essentially a vertical line so that maximum torque is transmitted to shaft 28 through disc 48. Since the angular relationship which exists between a conventionally cranked piston is eliminated or significantly reduced, increased efficiency for the engine is obtained, as well as increase in torque output. Fixed cams 34 and discs 64, 66 function and guide the lower end of the piston rod along the predetermined, curvilinear path. Output shaft 28 is offset from the vertical centerline of the cylinder, resulting in the increased torque output.

ALTERNATIVE PREFERRED EMBODIMENT

Figure 3:
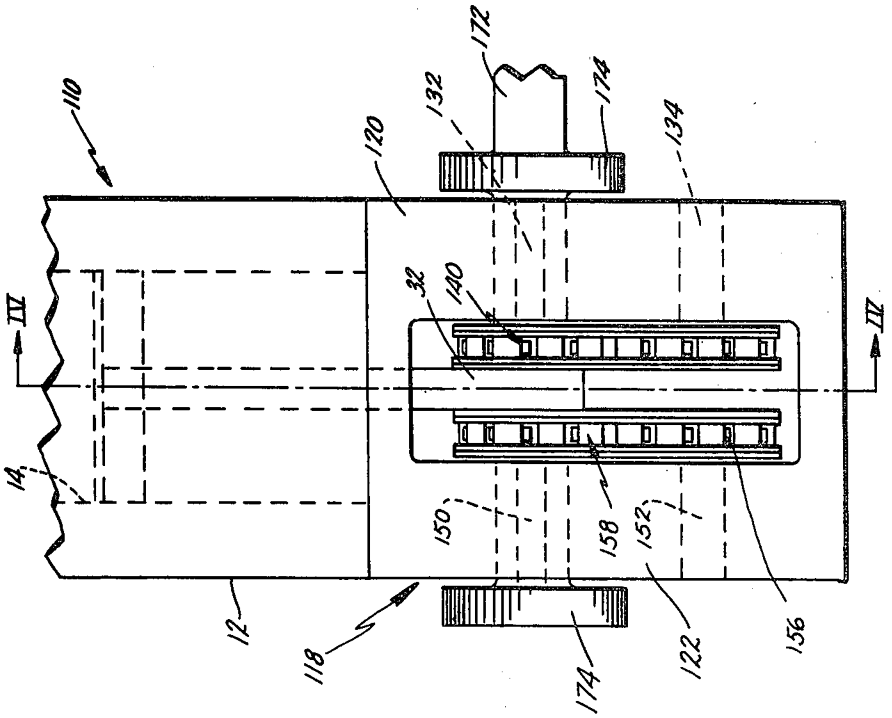
FIG. 3 is a fragmentary, side elevational view of another internal combustion engine in accordance with the present invention.
Figure 4:
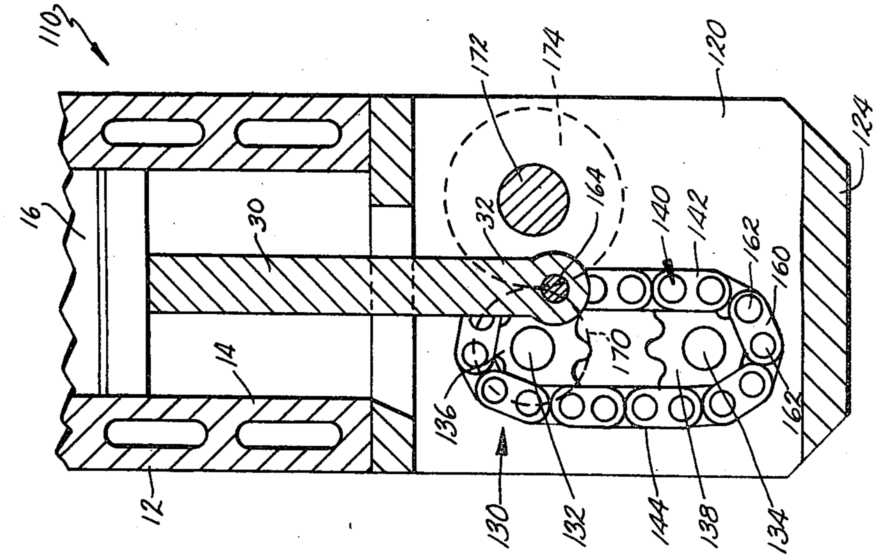
FIG. 4 is a fragmentary, side elevational view taken generally along line IV—IV of FIG. 3.

An alternative preferred embodiment of an internal combustion engine in accordance with the present invention is illustrated in FIGS. 3 and 4 and generally designated 110. In describing engine 110 herein, parts in common with embodiment 10 are designated by like numerals. Engine 110 includes a cylinder block 12 defining a cylinder 14 within which a piston 16 reciprocates. Block 12 is supported and secured to a case or shaft supporting structure 118. Case 118 includes end support members 120, 122 and a bottom cross member 124. As in embodiment 10, an elongated rod 30 has an upper end (not shown) pivotally connected by a suitable wrist pin in a conventional fashion to piston 16. Rod 30 extends downwardly into case 118 and is operatively connected to a guide means 130 at its lower end 32.

As seen in FIGS. 3 and 4, guide means 130 includes a first pair of vertically spaced stub shafts 132, 134 rotatably supported within end wall 120. Nonrotatably secured to the stub shafts are toothed sprockets 136, 138, respectively. An endless roller chain 140 extends around sprockets 136, 138 and defines a first run 142 and a second, horizontally spaced vertical run 144. Similarly, a pair of vertically spaced stub shafts 150, 152 are rotatably supported within end wall 122 in opposed relationship to shafts 132, 134. Nonrotatably secured to stub shafts 150, 152 are toothed sprockets 154, 156, respectively. An endless roller chain 158 extends around sprockets 154, 156. Chain 158 similarly defines horizontally spaced, first and second vertical runs.

Each roller chain, 140, 158 includes side plates 160 joined by pins 162. The lower end 32 of connecting rod 30 has a pin 164 extending therethrough. Pin 164 substitutes for one of the rollers of the roller chains 158, 140 and extends through the side plates of each of the roller chains.

As should be readily apparent, reciprocating movement of piston 16 results in movement of lower end 32 of rod 30 along the closed loop path defined by roller chains 140, 158. During the power stroke, end 32 will move vertically downwardly along the first run of each of the roller chains. As a result of this movement, the connecting rod will transmit torque to sprockets 136, 154 nonrotatably supported on stub shafts 132, 150, respectively. The vertical reciprocating movemnt of piston 16 is, therefore, converted to rotary movement of the stub shafts.

As seen in FIG. 3 and as schematically illustrated in FIG. 4, each stub shaft 132, 150 has nonrotatably secured thereto a drive gear 170 exteriorly of case 118. Extending through end walls 120, 122 and rotatably supported thereby is an output shaft 172. Output shaft 172 has driven gears 174 nonrotatably secured thereto exteriorly of end walls 120, 122. As schematically illustrated in FIG. 4, the driven gears 174 mesh with drive gears 170 on stub shafts 132, 150. The outer peripheries of the gears 174, 170 extend along and the gears mesh in the same plane as the plane of the centerline of the chains. This is similar to the positioning of the discs on shafts 26, 28 of embodiment 10. As a result, the rotary output movement of the stub shafts is transmitted to output shaft 172.

As with the embodiment illustrated in FIGS. 1 and 2, output shaft 172 is offset from the vertical centerline of cylinder 14 and piston 16. Shaft 172 is, however, in the same horizontal plane as stub shafts 132, 150. The lower end of the connecting rod is guided along a predetermined path defined by the roller chain. Embodiment 110, while being a functional equivalent of embodiment 10, would require an increased stroke over that employed generally in existing engines in order to permit proper selection of the chain to avoid excessive wear and noise in the chain drive. Embodiment 110, however, is of reduced complexity from embodiment 10 since shaft 26 is eliminated along with the disc secured thereto when the cam members are replaced by roller chain and meshing sprockets. With embodiment 110, the connecting rod 30 moves essentially along a perpendicular or vertical line during the power stroke to thereby increase the torque transmitted to output shaft 172 from that obtained by conventionally cranked engines.

FURTHER ALTERNATIVE EMBODIMENT

Figure 5:
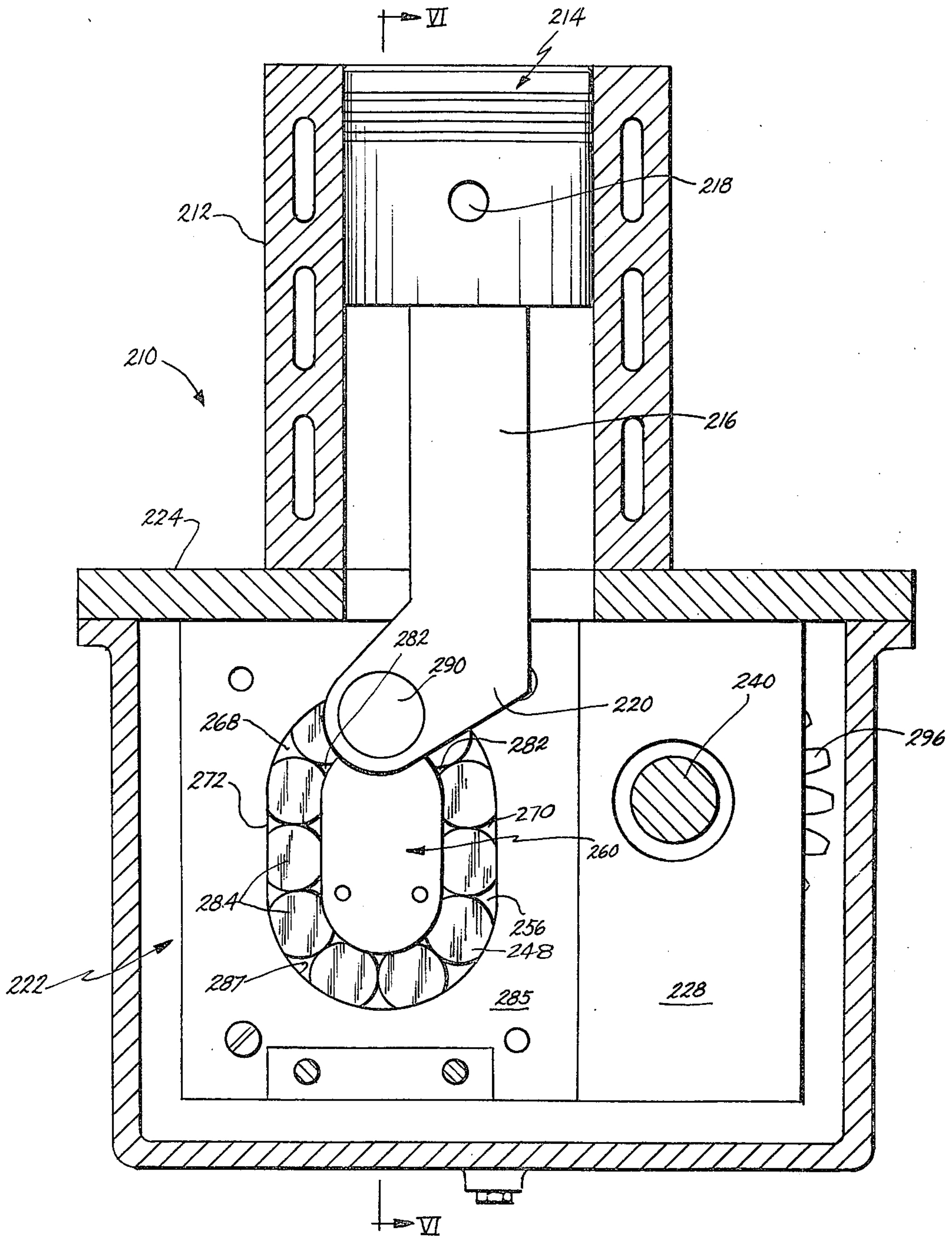
FIG. 5 is a front, elevational view in cross section of a further alternative embodiment.
Figure 6:
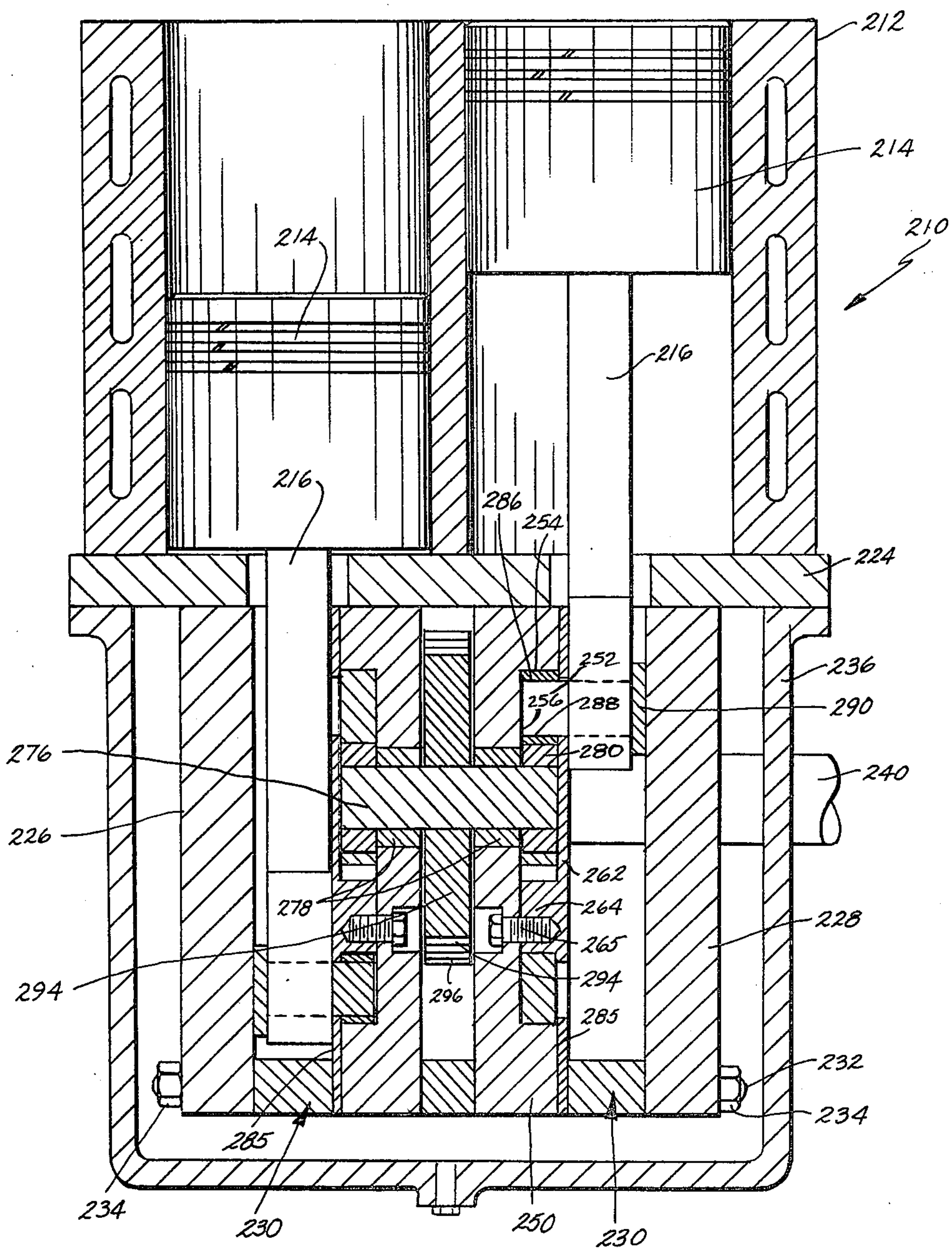
FIG. 6 is a cross-sectional view taken generally along line VI—VI of FIG. 5.

A still further alternative embodiment designated 210 of the present invention is illustrated in FIGS. 5 and 6. Embodiment 210, as with the previous embodiments, includes cylinders 212 within which are disposed reciprocating pistons 214. A connecting rod 216 has an upper end connected to piston 214 by a wrist pin 218. A rod lower end 220 of each rod 216 operatively engages an alternative power transmission means generally designated 222. In the two cylinder embodiments shown, the power transmission means 222 for each cylinder are in back-to-back relationship.

Means 222 are supported from a cylinder block-like structure including an upper plate 224, end plates 226, 228 and lower plates 230 which are secured to the end plates 226, 228 by threaded shafts or rods 232 and nuts 234. The entire power transmission means 222 is enclosed by an outer structure or pan 236 which is secured to the upper plate 224. The multi-cylinder embodiment of engine 210 illustrated in FIGS. 5 and 6 further includes a main shaft or output shaft 240. As with the previous embodiments, output shaft 240 is supported by plates 226, 228 in a position offset from the vertical centerline of cylinder 212.

Power transmission means 222 of embodiment 210 combines features of the embodiments of FIGS. 1 and 3. Means 222 incorporates a cam member structure while retaining the simplicity advantages of the embodiment of FIG. 3. This alternative has reduced parts and reduced complexity from the embodiment of FIG. 1 and is presently preferred.

Figure 7:
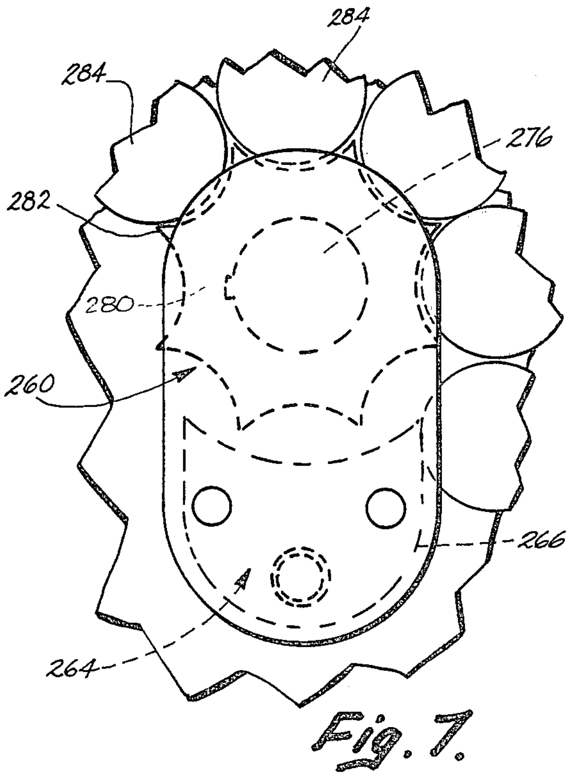
FIG. 7 is an enlarged, fragmentary front elevational view showing the sprocket, inner retainer, cam track and discs of the further embodiment.

A guide means for the rod lower end 220 is defined by a cam member 248. Cam member 248 includes an outer or main retainer plate 250. Plate 250 defines a generally oval or elliptical shaped recess 252. Recess 252 includes a sidewall 254 and a base 256. Secured generally centrally of recess 252 is an inner retainer plate generally designated 260. Inner retainer plate 260 includes a generally planar flange-like main portion 262 and a boss 264. As seen in FIGS. 6 and 7, boss 264 defines a curvilinear wall 266. Plate 260 is secured to plate 250 by a bolt 265 threaded into portion 264.

Outer retainer plate 250 and inner retainer plate 260 define a cam track 268. Cam track 268 includes a first vertical run 270 and a second vertical run 272. As seen in FIG. 5, vertical run 270 lies generally on the vertical centerline of cylinder 212. A jackshaft 276 is rotatably supported on cam plates 250 by plane bearings 278. A drive member in the form of a sprocket 280 is secured to each end of the jackshaft 276. Sprockets 280, therefore, are disposed within the recesses 252 defined by plates 250. Each sprocket 280 defines a plurality of teeth 282.

Disposed within cam track 268 are a plurality of discs 284. Discs 284 define a force transmission member which moves around the cam track. As best seen in FIGS. 6 and 7, discs 284 are retained between wall 254 of plate 250 and wall 266 of retainer plate 260 as they move along the cam track. The discs will engage the teeth 282 of sprocket 280. A cover plate 285 defining an aperture 287 is secured to cam plate 250. Plate 285 insures that discs 284 are retained within the cam track.

As seen in FIG. 6, one of the discs designated 286 defines a central aperture 288. A pin 290 extends through rod lower end 220 and is pressfitted into aperture 288 of disc 286. As a result, the rod lower end will be guided along the cam track defined by the cam member. Plates 285 and 260 define a slot having a width less than the diameter of a disc 284 but greater than the diameter of pin 290.

In the multi-cylinder embodiment of FIG. 6, jackshaft 276 has a gear 294 nonrotatably secured thereto. Gear 294 meshes with an output gear 296 which is nonrotatably secured to main or output shaft 240. As a result, rotation of jackshaft 276 results in rotation of the main or output shaft 240.

The operation of the alternative embodiment of FIGS. 5 and 6 should now be readily apparent. As piston 214 in each cylinder reciprocates, rod lower end 220 will move along the cam track 268. Disc 286 receiving pin 290 of the rod lower end will also move along the cam track. Since disc 286 is in abutting relationship with adjacent disc 284, all of the discs will move and are guided along the cam track. The discs 284, 286 will contact the teeth 282 of sprocket 280. This causes jackshaft 276 to rotate. Rotation of jackshaft 276 in turn causes rotation of the output shaft 240 through the intermeshing gears 294, 296.

Figure 8:
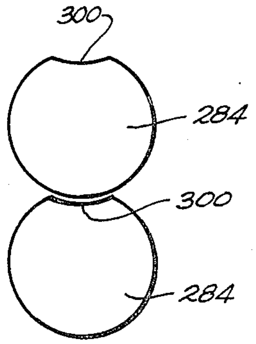
FIG. 8 is a plan view showing modified discs usable in the embodiment of FIG. 5.

Due to the forces exerted on discs 284, it is believed that these discs will only slide within the cam track and will not roll on the walls 254, 266 of the track. As an alternative, and as seen in FIG. 8, the disc 284 could be formed with curved recesses 300 for receiving an adjacent disc. Recesses 300 would permit disc 284 to articulate, in effect, with each other yet prevent rotation about the disc central axes. Rolling action on the walls of the cam track would be prevented in a positive fashion.

Embodiment 210 has the advantages of a chain drive arrangement yet eliminates the disadvantage of increased stroke necessary for proper selection of chain to avoid excessive wear and noise. Embodiment 210 is of reduced complexity from embodiment 10 and embodiment 110 since the need for multiple shafts and sprockets is eliminated. Connecting rod 216 moves essentially along a perpendicular or vertical line during the power stroke. The power transmission means, therefore, increases the torque transmitted to shaft 276 and to the output shaft 240 when compared to conventionally cranked engines.

Figure 9:
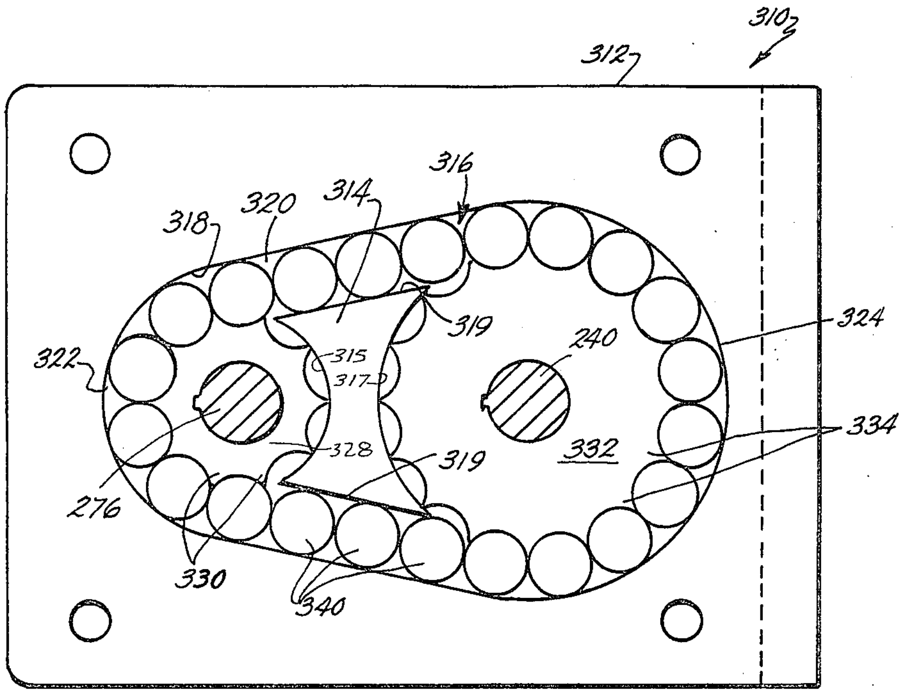
FIG. 9 is an enlarged, front elevational, cross-sectional view of a power transmission means in accordance with the present invention for transmitting power from the jackshaft to the main shaft of the embodiment of FIG. 5.

FIG. 9 illustrates a modified power transmission means in accordance with the present invention and generally designated 310. Power transmission means 310, as illustrated, replaces gear 294 on jackshaft 276 and gear 296 on the main or output shaft 240. Power transmission means 310 includes a cam member having an outer retainer plate 312 and an inner retainer plate 314. Outer plate 312 defines an elongated recess 316 which has a continuous sidewall 318 and a base or bottom 320. Inner plate 314 has configured ends 315, 317 and sidewalls 319 which are parallel with sidewall 318. Plate 312 and retainer plate 314 define a closed loop cam track having spaced first and second runs.

Jackshaft 276 extends through recess 316 adjacent a curved end 322 thereof. Main or output shaft 240 extends through recess 216 adjacent a curved end 324 thereof. Secured to jackshaft 276 is a sprocket 328. Sprocket 328 includes a plurality of teeth 330. Secured to output shaft 240 is a sprocket 332 which defines a plurality of teeth 334. The peripheries of the sprockets extend within the runs of the cam track or, in other words, the track extends around the sprockets. Sprocket 332 has more teeth than sprocket 328. Selection of the sprockets determines the "final drive" ratio of the engine.

Positioned within recess 316 and extending around the cam track defined by plate 312 and inner retainer plate 314 are a plurality of force transmission discs 340. As should be apparent, rotation of the jackshaft 276 caused by power transmission means 222 will result in rotation of the output shaft 240 through the discs 340. A cover plate (not shown) having an aperture configured to insure that discs 340 are retained in the track would be secured to member 312. The separate cover plate could be eliminated, possibly, if plate 312 is positioned against a rear face 342 of cam plate member 250.

Power transmission means 310 may be necessary in higher horsepower engines which might overload intermeshing gears 294, 296 of the embodiment illustrated in FIGS. 5 and 6. Further, power transmission means 310 readily illustrates the adaptability of the invention to use as a reduction gear box or other power transmission mechanism. The concepts disclosed herein are not limited to converting reciprocating motion of a connecting rod to rotary output motion. With power transmission means 310, the "main shaft" is merely moved within the cam track and a driven sprocket is contacted by the power transmission means or member in the form of discs 340. Proper selection of sprockets 328, 332 permits the "final" drive ratio to the output shaft to be greater or less than one. This would permit the engine to achieve low rpm, high torque operation characteristics without the necessity of an overdrive in the transmission.

The guide means illustrated each guide the lower end of a connecting rod through an elliptical-like or oval shaped path or course, the radii of which reverse the reciprocal action of the piston. The guide path, depending upon the configuration thereof, may have convex or concave lines, as illustrated in FIG. 2, or chordal straight lines, as illustrated in FIGS. 4 and 5. That is, the first and second runs of the guide path may be curvilinear or straight parallel lines which are also parallel to the vertical or center axis of the cylinder. The mechanisms illustrated permit the pressure generated in the combustion chamber to be applied by the piston through the lower end of the connecting rod essentially in line with the centerline of the cylinder. This increases the efficiency of the engine by increasing the mechanical advantage during the power stroke and by reducing frictional and other losses which would be encountered in the conventionally cranked engine.

The mechanisms illustrated for converting the reciprocating motion of a piston to rotary output motion are adaptable to existing internal combustion engines. The mechanisms, it is believed could be manufactured as replacements for the conventional crank presently employed. Further, these mechanisms could be used to convert rotary movement to rotary movement or rotary movement to reciprocating movement.

In view of the foregoing description, those of ordinary skill in the art might envision various modifications which would not depart from the inventive concepts disclosed herein. For example, the timing gears of the embodiment of FIG. 1 or the output gears 294, 296 of the FIG. 5 embodiment could be changed to a chain/-sprocket arrangement. It is expressly intended, therefore, that the above description should be considered as that of the preferred embodiments. The true spirit and scope of the present invention may be determined by reference to the appended claims.

The embodiments of the invention in which an exclusive property or privilege is claimed are defined as follows.

I claim:

1. A power transmission mechanism comprising:

a fixed cam member defining an elongated, closed loop cam track having first and second, spaced runs;

force transmission means disposed within and movable around said cam track for transmitting a force along said cam track, said transmission means including a plurality of independent unconnected members disposed within and moving along said track in abutting relationship;

an output shaft;

means for rotatably supporting said output shaft adjacent said first run of said cam member; and drive means operatively connected to said force transmission means and said output shaft for drivingly interconnecting said force transmission means and said output shaft whereby power will be transmitted between said force transmission means and said output shaft, said independent members contacting said drive means as they move along said track.

2. A power transmission mechanism as defined by claim 1 wherein said members of said force transmission means comprise:

a plurality of discs disposed within said cam track in abutting relationship.

3. A power transmission mechanism as defined by claim 2 wherein said drive means comprises:

another shaft rotatably supported by said cam member; and a drive member secured to said another shaft and having a periphery extending at least partially within said cam track to be engaged by said discs of said force transmission means, said output shaft being supported by said cam member and including a driven member secured thereto and having a periphery extending at least partially within said cam track to be engaged by said discs whereby rotation of said another shaft transmits power to said output shaft through said discs.

4. A power transmission mechanism as defined by claim 3 wherein said drive member and said driven member each comprise a sprocket, said discs contacting said sprockets as they move along said cam track to transmit power between said shafts.

5. A power transmission mechanism as defined by claim 1 wherein said drive means comprises:

another shaft rotatably supported by said cam member; and a drive member secured to said another shaft and having a periphery extending at least partially within said cam track to be engaged by said force transmission means whereby movement of said force transmission means causes said another shaft to rotate.

6. A power transmission mechanism as defined by claim 5 wherein said drive means further comprises:

means interconnecting said another shaft and said output shaft for rotating said output shaft as said another shaft rotates.

7. A power transmission mechanism as defined by claim 6 wherein said means for interconnecting said another shaft and said output shaft comprises:

a first gear secured to said another shaft; and a second gear secured to said output shaft, said second gear meshing with said first gear.

8. A power transmission mechanism as defined by claim 6 wherein said drive member comprises a sprocket.

9. A power transmission mechanism as defined by claim 8 wherein said members of said force transmission means comprise:

a plurality of discs disposed within said cam track in abutting relationship, said discs contacting said sprocket as they move along said cam track to rotate said sprocket.

10. A power transmission mechanism as defined by claim 9 wherein said fixed cam member comprises:

an outer retainer defining a generally oval recess; and an inner retainer secured to said outer retainer generally centrally of said recess, said retainers defining said cam track.

11. A power transmission mechanism as defined by claim 10 wherein said fixed cam member further includes:

a cover plate secured to said outer retainer to retain said discs within said cam track.

12. An internal combustion engine including a cylinder defining a vertical centerline, a piston reciprocal within a cylinder, a connecting rod having an upper end connected to the piston and power transmission means operatively connected to a lower end of the rod for converting reciprocating movement of the piston and rod to rotary output movement, said power transmission means comprising:

a cam member fixed with respect to said cylinder and defining an elongated closed loop cam track having first and second, spaced runs, said lower end of said rod including a pin disposed within said cam track;

a shaft rotatably supported by said cam member;

a drive member secured to said shaft and having a peripheral portion extending along said cam track; and force transmitting means operatively connected to said rod lower end for transmitting a force to said drive member to rotate said shaft as said rod lower end moves along said cam track, said force transmitting means including a plurality of independent unconnected members disposed within and move along said track in abutting relationship, said independent members contacting said drive member as they move along said track.

13. An internal combustion engine as defined by claim 12 wherein said members of said force transmitting means comprise:

a plurality of discs disposed within said cam track in abutting relationship for movement along said cam track as said rod lower end moves along said cam track.

14. An internal combustion engine as defined by claim 13 wherein said drive member comprises:

a sprocket defining a plurality of teeth, said teeth being engaged by said discs.

15. An internal combustion engine as defined by claim 14 wherein said cam member comprises:

an outer retainer defining a generally oval recess; and an inner retainer secured to said outer retainer generally centrally of said recess, said retainers defining said cam track.

16. An internal combustion engine as defined by claim 15 further including:

an output shaft; and means for rotatably supporting said output shaft adjacent said cam member and offset from a vertical centerline of said cam member.

17. An internal combustion engine as defined by claim 16 further comprising:

means on said shaft and said output shaft for causing said output shaft to rotate upon rotation of said shaft.

18. An internal combustion engine as defined by claim 16 further including another power transmission means for transmitting power from said shaft to said output shaft, said another power transmission means comprising:

a fixed cam member defining a closed loop cam track extending around said shaft and said output shaft, said cam track having first and second, spaced runs;

a drive sprocket secured to said shaft and having a periphery extending within said runs;

a driven sprocket secured to said output shaft and having a periphery within said runs; and a plurality of discs disposed within said cam track in abutting relationship, said discs engaging said drive sprocket and said driven sprocket as they move around said cam track so that power is transmitted from said shaft to said output shaft.

19. An internal combustion engine as defined by claim 18 wherein said cam member of said another power transmission means comprises:

an outer retainer defining an elongated recess having curved ends, a sidewall and a bottom; and an inner retainer secured to said outer retainer generally centrally of said recess, said retainers defining said cam track.

20. An internal combustion engine as defined by claim 19 wherein said drive sprocket and said driven sprocket have a gear ratio greater than 1.

21. An internal combustion engine as defined by claim 12 further including:

an output shaft; and means for rotatably supporting said output shaft adjacent said cam member and offset from a vertical centerline of said cam member.

22. An internal combustion engine as defined by claim 21 wherein said drive member comprises:

a sprocket defining a plurality of teeth, said teeth being engaged by said force transmitting means.

23. An internal combustion engine as defined by claim 22 wherein said members of said force transmitting means comprise:

a plurality of discs disposed within said cam track, said discs being in abutting relationship for movement along said cam track as said rod lower end moves along said cam track.

24. An internal combustion engine as defined by claim 23 wherein one of said discs defines a central aperture and said pin of said rod lower end is disposed within said aperture.

25. An internal combustion engine as defined by claim 24 wherein said fixed cam track has a vertical centerline offset from the vertical centerline of said cylinder.

26. An internal combustion engine as defined by claim 25 further including:

a pair of intermeshed gears, one of said gears of said pair of gears being secured to said shaft and the other of said gears of said pair of gears being secured to said output shaft.

27. An internal combustion engine as defined by claim 25 further including another power transmission means for transmitting power from said shaft to said output shaft, said another power transmission means comprising:

a fixed cam member defining a closed loop cam track extending around said shaft and said output shaft, said cam track having first and second, spaced runs;

a drive sprocket secured to said shaft and having a periphery extending within said runs;

a driven sprocket secured to said output shaft and having a periphery within said runs; and a plurality of discs disposed within said cam track in abutting relationship, said discs engaging said drive sprocket and said driven sprocket as they move around said cam track so that power is transmitted from said shaft to said output shaft.

28. An internal combustion engine as defined by claim 27 wherein said cam member of said another power transmission means comprises:

an outer retainer defining an elongated recess having curved ends, a sidewall and a bottom; and an inner retainer secured to said outer retainer generally centrally of said recess, said retainers defining said cam track.

29. An internal combustion engine as defined by claim 28 wherein said drive sprocket and said driven sprocket are of different diameter and one of said sprockets has more teeth than the other of said sprockets.

* * * * *

UNITED STATES PATENT AND TRADEMARK OFFICE

CERTIFICATE OF CORRECTION

PATENT NO. : 4,465,042

DATED : August 14, 1984

INVENTOR(S) : Robert D. Bristol

It is certified that error appears in the above-identified patent and that said Letters Patent is hereby corrected as shown below:

Column 10, line 46:

"a cylinder" should be --the cylinder--.

Signed and Sealed this

*Twenty-sixth* Day of *February 1985*

[SEAL]

*Attest:*

DONALD J. QUIGG

*Attesting Officer* *Acting Commissioner of Patents and Trademarks*